(No Model.)

J. D. BEEBE.
RUBBER TIRE.

No. 558,342. Patented Apr. 14, 1896.

Witnesses: Inventor.
Geo. E. Fuchs J. D. Beebe
James W. Bevant by J. Patterson Nesbet
Attorneys

UNITED STATES PATENT OFFICE.

JOHN D. BEEBE, OF COLUMBUS, OHIO, ASSIGNOR TO THE BEEBE TIRE MANUFACTURING COMPANY, OF PORTLAND, MAINE.

RUBBER TIRE.

SPECIFICATION forming part of Letters Patent No. 558,342, dated April 14, 1896.

Application filed July 10, 1895. Serial No. 555,556. (No model.)

*To all whom it may concern:*

Be it known that I, JOHN D. BEEBE, of Columbus, in the county of Franklin and State of Ohio, have invented certain new and useful Improvements in Rubber Tires; and I do hereby declare the following to be a full, clear, and exact description of the invention, such as will enable others skilled in the art to which it pertains to make and use it, reference being had to the accompanying drawings, which form part of this specification.

My invention relates to improvements in rubber tires, and is intended as an improvement upon my Patent No. 524,272, granted August 7, 1894.

The primary object of my present invention is to produce a spring-tire very resilient and yet having a high degree of compressible resistance and a protecting network by embedding therein a plurality of concentric layers of fine flat springs formed of lateral deflections, the deflections of the layers being staggering in cross-section of the tire, and the layers separated and supported by interposed rubber.

A further object of my invention is to form a rubber tire having a spring formed of parallel convolutions of the same length throughout the entire circumference of the tire whereby the springs may be wrapped several times around the tire, and to interpose soft rubber in between the several layers of springs thus formed and vulcanizing it, whereby the layers of the springs are united and yet separated by the said rubber.

Figure 1:
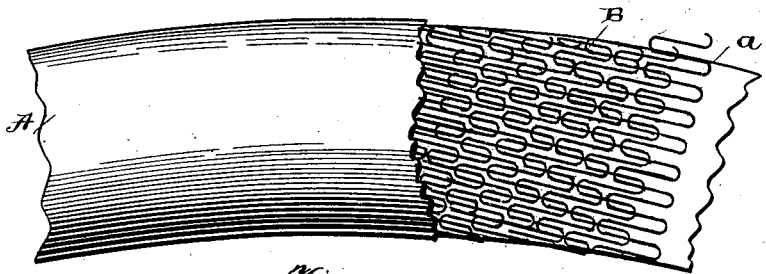
Figure 2:
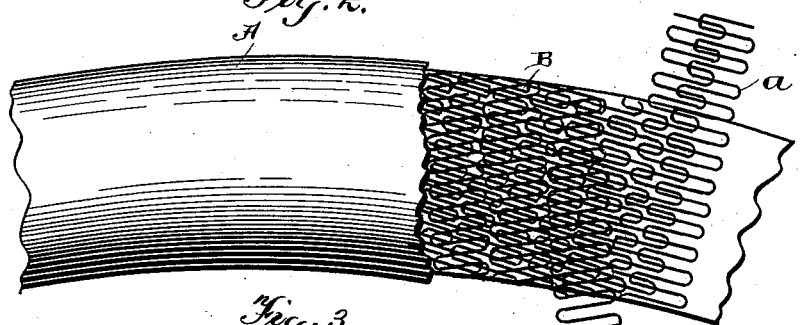
Figure 3:
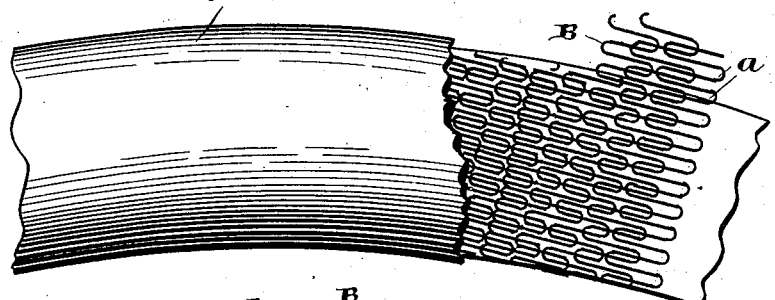
Figure 4:
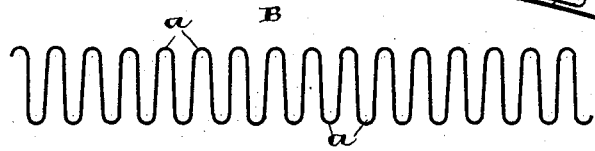
Figure 5:
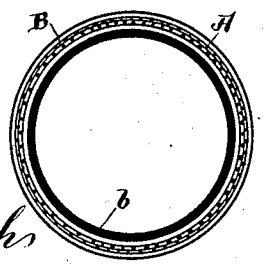
Figure 6:
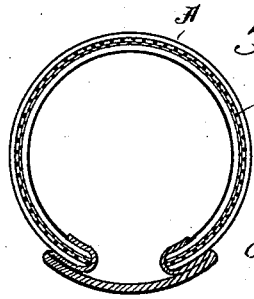

In the accompanying drawings, Figure 1 is a view of a tire embodying my invention, a portion of the rubber on the outside being broken away to exhibit the springs. Fig. 2 is a similar view showing the springs wrapped in a slightly-modified form. Fig. 3 is also a similar view showing another manner of applying the springs. Fig. 4 is a detached view of a portion of the springs before application to the tire. Fig. 5 is a cross-sectional view of the tire shown in Figs. 1, 2, and 3. Fig. 6 is a cross-sectional view of the mechanically-applied tire with my invention applied thereto.

In Figs. 1, 2, and 3 the springs have been shown as though there were not any rubber between them, for the purpose of better illustrating the invention; but, as will be noticed from the description of Fig. 5, it illustrated a cross-section of Figs. 1, 2, and 3. The rubber is finally preferably disposed between the springs.

A represents a rubber tire, which has applied between its surfaces one or several layers of the springs illustrated in Fig. 4. This spring consists of a series of parallel convolutions, and the spring is the same width throughout its entire length, and consequently throughout the entire circumference of the tire, whereby it may be wrapped around as many times as desired to secure the proper amount of resiliency and external depressing strength or tension.

The portion $a$ of the spring shown in Fig. 4 forms separate springs between the parallel portions of the convolutions, each one acting independent of its neighbor, as will be readily understood, and the lateral deflections of the springs are arranged staggering in cross-section of the tire, as clearly shown, which forms an effective protection for the tire in addition to the supporting qualities of the several layers.

I am enabled with this peculiar form of spring arranged as shown and described to construct a tire sufficiently strong to support the rider, and yet have that resiliency which is the characteristic of pneumatic tires. In some instances I provide the interior surface of the tire with an air-tight coating of rubber $b$. This enables the application of the pneumatic principle, and the springs serve to prevent puncture and cutting of the tire, as will be readily understood.

Having thus fully described my invention, what I claim, and desire to secure by Letters Patent, is—

1. A rubber tire having embedded therein a light flat spring formed of lateral deflections and arranged in a plurality of concentric layers one over the other, the deflections of the layers arranged staggering in cross-section of the tire and each layer separated and supported from its neighbor by interposed rubber, the whole combining to produce a very resilient tire with a high degree of compressible resistance and a protecting-network.

2. A rubber tire having embedded therein a spring formed of parallel convolutions, the said spring being of the same width throughout its entire length and wrapped around several times to secure the required strength or external resistance, the rubber of the tube being between, uniting, separating and supporting the several layers, substantially as described.

In testimony whereof I affix my signature in presence of two witnesses.

JOHN D. BEEBE.

Witnesses:
 LOUIS MCCALLISTER,
 FRANK N. BEEBE.